(12) United States Patent
Choi

(10) Patent No.: US 10,983,723 B2
(45) Date of Patent: Apr. 20, 2021

(54) MEMORY ACCESS CONTROL METHOD AND APPARATUS

(71) Applicant: Samsung Electronics Co., Ltd., Suwon-si (KR)

(72) Inventor: Yong-seok Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 188 days.

(21) Appl. No.: 15/533,190

(22) PCT Filed: Nov. 11, 2015

(86) PCT No.: PCT/KR2015/012113
§ 371 (c)(1),
(2) Date: Jun. 5, 2017

(87) PCT Pub. No.: WO2016/089020
PCT Pub. Date: Jun. 9, 2016

(65) Prior Publication Data
US 2017/0337015 A1 Nov. 23, 2017

(30) Foreign Application Priority Data

Dec. 5, 2014 (KR) .......................... 10-2014-0174291

(51) Int. Cl.
*G06F 12/00* (2006.01)
*G06F 3/06* (2006.01)
*G06F 12/14* (2006.01)

(52) U.S. Cl.
CPC .......... *G06F 3/0659* (2013.01); *G06F 3/0604* (2013.01); *G06F 3/0611* (2013.01);
(Continued)

(58) Field of Classification Search
CPC .... G06F 13/1663; G06F 13/18; G06F 3/0659; G06F 9/52; G06F 2201/86;
(Continued)

(56) References Cited

U.S. PATENT DOCUMENTS 3,702,462 A * 11/1972 England .................. G06F 13/38
710/1
4,354,232 A * 10/1982 Ryan .................... G06F 12/0855
365/189.05

(Continued)

FOREIGN PATENT DOCUMENTS

JP 2000-501539 A 2/2000
KR 10-1999-0071554 A 9/1999
(Continued)

*Primary Examiner* — Prasith Thammavong
(74) *Attorney, Agent, or Firm* — Jefferson IP Law, LLP

(57) ABSTRACT

Provided are a method and an apparatus for controlling access to memory. The method, performed by a memory device, of controlling access of a master device, includes: receiving, from the master device, an access request with respect to at least one of a plurality of banks included in the memory device; determining whether access to each of the at least one bank to which access was requested is granted; and generating validity information representing whether the access to each of the at least one bank to which access was requested is granted, and transmitting the generated the validity information to the master device.

15 Claims, 12 Drawing Sheets

(52) U.S. Cl.
CPC .......... *G06F 3/0673* (2013.01); *G06F 3/0679* (2013.01); *G06F 3/0688* (2013.01); *G06F 12/1433* (2013.01)

(58) Field of Classification Search
CPC .... G06F 12/0855; G06F 21/725; G06F 9/544; G06F 12/0846; G06F 13/1647; G06F 12/0875; G06F 2212/1008; G06F 2212/251; G06F 2212/452; G06F 12/0811; G06F 12/084; G06F 12/0842; G06F 12/0844; G06F 2212/1016; G06F 3/0613; G06F 3/0637; G06F 3/0673
See application file for complete search history.

(56) References Cited

U.S. PATENT DOCUMENTS

| | | | | |
|---|---|---|---|---|
| 4,796,232 A | * | 1/1989 | House | G06F 13/18 365/189.03 |
| 5,142,638 A | * | 8/1992 | Schiffleger | G06F 13/1663 711/148 |
| 5,202,970 A | * | 4/1993 | Schiffleger | G06F 13/1663 711/148 |
| 5,596,740 A | | 1/1997 | Quattromani et al. | |
| 5,659,711 A | * | 8/1997 | Sugita | G11C 8/16 711/144 |
| 5,706,407 A | * | 1/1998 | Nakamura | G06F 1/3215 700/251 |
| 6,611,904 B1 | | 8/2003 | Uguen | |
| 6,978,343 B1 | * | 12/2005 | Ichiriu | G11C 15/00 365/49.1 |
| 7,730,261 B1 | * | 6/2010 | Yung | G06F 12/084 711/130 |
| 7,894,296 B2 | | 2/2011 | Lee et al. | |
| 8,108,625 B1 | * | 1/2012 | Coon | G06F 13/1663 711/127 |
| 8,380,940 B2 | | 2/2013 | Wang et al. | |
| 8,788,794 B2 | | 7/2014 | Serebrin et al. | |
| 9,086,959 B2 | | 7/2015 | Seo et al. | |
| 9,576,637 B1 | * | 2/2017 | Balakrishnan | G11C 11/40618 |
| 2003/0217224 A1 | * | 11/2003 | Watts | G06F 13/1626 711/105 |
| 2005/0013185 A1 | * | 1/2005 | Kim | G11C 11/40618 365/222 |
| 2005/0232068 A1 | * | 10/2005 | Kubo | G11C 8/06 365/233.5 |
| 2005/0268027 A1 | * | 12/2005 | Katsuki | G06F 12/0875 711/105 |
| 2005/0268050 A1 | | 12/2005 | Suh | |
| 2007/0088886 A1 | * | 4/2007 | Conner | G06F 13/1663 710/244 |
| 2007/0143677 A1 | * | 6/2007 | Pyeon | G11C 11/408 715/700 |
| 2008/0077741 A1 | * | 3/2008 | Yasui | G06F 13/18 711/129 |
| 2008/0098153 A1 | * | 4/2008 | Nishioka | G06F 13/1631 711/5 |
| 2008/0301354 A1 | * | 12/2008 | Bekooij | G06F 13/1652 711/100 |
| 2011/0066821 A1 | * | 3/2011 | Rijshouwer | G11C 7/1006 711/165 |
| 2011/0252204 A1 | * | 10/2011 | Coon | G06F 12/084 711/150 |
| 2011/0289256 A1 | * | 11/2011 | Bartlett | G06F 12/0844 711/3 |
| 2012/0072796 A1 | * | 3/2012 | Chirca | G06F 12/0862 714/723 |
| 2012/0079155 A1 | * | 3/2012 | Damodaran | H03K 19/0016 710/244 |
| 2012/0166742 A1 | * | 6/2012 | Wang | H03M 13/2957 711/154 |
| 2013/0097388 A1 | * | 4/2013 | Kajigaya | G06F 13/16 711/147 |
| 2013/0132675 A1 | * | 5/2013 | Sleiman | G06F 12/0844 711/122 |
| 2013/0151794 A1 | * | 6/2013 | Park | G06F 12/00 711/150 |
| 2013/0332665 A1 | | 12/2013 | Sikdar et al. | |
| 2014/0115278 A1 | * | 4/2014 | Redford | G06F 12/00 711/150 |
| 2014/0297989 A1 | * | 10/2014 | Honjo | G06F 12/0607 711/171 |
| 2015/0134884 A1 | * | 5/2015 | Lin | G06F 13/18 711/103 |
| 2015/0243360 A1 | * | 8/2015 | Loibl | G11C 11/1673 711/103 |
| 2016/0092367 A1 | * | 3/2016 | Kluchnikov | G06F 12/0844 711/125 |

FOREIGN PATENT DOCUMENTS

| | | |
|---|---|---|
| KR | 10-2011-0040103 A | 4/2011 |
| KR | 10-2013-0127473 A | 11/2013 |

\* cited by examiner

MEMORY ACCESS CONTROL METHOD AND APPARATUS

TECHNICAL FIELD

The present invention relates to a method and apparatus for controlling access to memory in relation to data transmission.

BACKGROUND ART

Use of banked multi-port memory that includes a plurality of banks and allows a plurality of master devices to perform simultaneous data transmission has increased. The banked multi-port memory allows the plurality of master devices to perform simultaneous access, thereby increasing a data processing speed as compared with single-port memory.

However, when the plurality of master devices request access to the same bank included in the memory, bank conflict may occur, which may degrade the performance of the banked multi-port memory.

Accordingly, research into banked multi-port memory for enhancing the performance thereof by appropriately controlling accesses of a plurality of master devices has been actively conducted.

DETAILED DESCRIPTION OF THE INVENTION

Technical Problem

The present invention provides a method, performed by a memory device, of controlling access of a master device.

Technical Solution

According to an aspect of the present invention, there is provided a method and apparatus for controlling access of a master device to a bank in a memory device.

Advantageous Effects

A memory device is able to perform an efficient operation when controlling access of a master device.

BEST MODE

Figure 1:
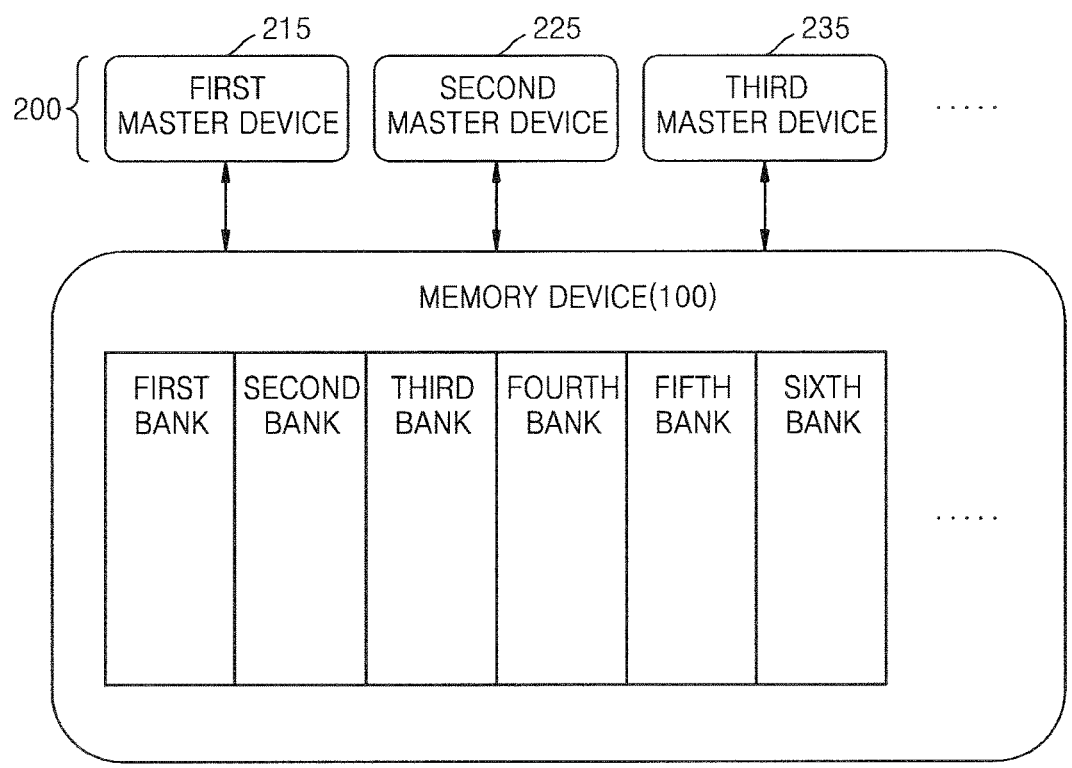
FIG. 1 is a schematic diagram for describing a method in which a memory device controls access of a master device, according to an embodiment of the present invention.

According to an aspect of the present invention, a method, performed by a memory device, of controlling access of a master device, the method includes: receiving, from the master device, an access request with respect to at least one of a plurality of banks included in the memory device; determining whether access to each of the at least one bank to which access was requested is granted; and generating validity information representing whether the access to each of the at least one bank to which access was requested is granted, and transmitting the generated the validity information to the master device.

The determining may include: determining whether bank conflict occurs between the access request of the master device and an access request of another master device; when it is determined that the bank conflict has occurred, determining a priority of the access requests; and determining, based on the priority, whether access to each of the at least one bank to which access was requested is granted.

The priority may be determined based on an urgency level determined by the master device.

The access request may be a 2-bit signal including a partial access signal for requesting the validity information.

The master device may be able to access at least one of the at least one bank to which access was requested.

The method may further include: performing data processing requested by the master device, with respect to a bank to which access of the master device has been granted as a result of the determining.

The method may further include: receiving again from the master device an access request with respect to a bank to which access has been refused based on the validity information.

According to another aspect of the present invention, a method, performed by a master device, of accessing a memory device, includes: transmitting, to the memory device, an access request with respect to at least one of a plurality of banks included in the memory device; and receiving, from the memory device, validity information representing whether access to each of the at least one bank to which access was requested is granted.

The access request may be a 2-bit signal including a partial access signal for requesting the validity information.

The method may further include: requesting data processed by at least one bank access-granted from among the at least one bank, based on the received validity information.

The method may further include: re-transmitting an access request with respect to at least one bank to which access was refused from among the at least one bank, based on the received validity information.

According to another aspect of the present invention, a memory device includes: an access request receiver configured to receive, from a master device, an access request with respect to at least one of a plurality of banks included in a memory device; an arbitrator configured to determine whether access of each of the at least one bank to which access was requested is granted, and to generate validity information representing whether access to each of the at least one bank to which access was requested is granted; and a request result transmitter configured to transmit the generated validity information to the master device.

The arbitrator may be configured to determine whether bank conflict occurs between the access request of the master device and an access request of another master device, determine a priority of the access requests when it is determined that the bank conflict has occurred, and determine, based on the priority, whether access to each of the at least one bank to which access was requested is granted.

The priority may be determined based on an urgency level determined by the memory device.

The access request may be a 2-bit signal including a partial access signal that requests the validity information.

The master device may access at least one of the at least one access-requested bank.

The memory device may perform data processing requested by the master device, with respect to a bank to which access of the master device has been granted as a result of the determination of the arbitrator.

1 The access request receiver may re-receive from the master device an access request with respect to a bank to which access has been refused based on the validity information.

According to another aspect of the present invention, there is provided a master device including a prefetch unit configured to transmit an access request with respect to at least one of a plurality of banks included in a memory device to the memory device and to receive, from the memory device, validity information representing whether access to each of the at least one bank is granted.

The access request may be a 2-bit signal including a partial access signal that requests the validity information.

The prefetch unit may request at least one bank access-granted from among the at least one access-requested bank, based on the received validity information.

The prefetch unit may re-transmit an access request with respect to at least one bank access-refused from among the at least one access-requested bank, based on the received validity information.

MODE OF THE INVENTION

Embodiments of the present invention are described in detail herein with reference to the accompanying drawings so that this disclosure may be easily performed by one of ordinary skill in the art to which the present invention pertain. The present invention may, however, be embodied in many different forms and should not be construed as being limited to the embodiments set forth herein. In the drawings, parts irrelevant to the description are omitted for simplicity of explanation, and like numbers refer to like elements throughout.

Throughout the specification, when an element is referred to as being "connected" or "coupled" to another element, it can be directly connected or coupled to the other element, or can be electrically connected or coupled to the other element with intervening elements interposed therebetween. In addition, the terms "comprises" and/or "comprising" or "includes" and/or "including" when used in this specification, specify the presence of stated elements, but do not preclude the presence or addition of one or more other elements.

The present invention will now be described more fully with reference to the accompanying drawings, in which exemplary embodiments of the invention are shown.

FIG. 1 is a schematic diagram for describing a method in which a memory device controls access of a master device, according to an embodiment of the present invention.

According to an embodiment of the present invention, a memory device 100 may be connected to a plurality of master devices. The memory device 100 and the plurality of master devices may be implemented by using a single processor or a plurality of processors.

According to an embodiment of the present invention, the memory device 100 may include a plurality of banks. The memory device 100 may receive access requests with respect to at least one bank from the plurality of master devices, respectively.

According to an embodiment of the present invention, bank conflict may occur due to the access requests with respect to at least one bank respectively transmitted by the plurality of master devices. For example, when access to the same bank among banks requested to be accessed by a first master device 215 and banks requested to be accessed by a second master device 225 is requested, bank conflict may occur.

According to an embodiment of the present invention, when bank conflict has occurred, the memory device 100 may determine granting access according to an access request having a higher priority. The memory device 100 may also determine whether a partial access request exists for an access request having a lower priority.

According to an embodiment of the present invention, when a partial access request exists for the access request having a lower priority, the memory device 100 may determine whether access to each of a plurality of access-requested banks is granted. The memory device 100 may generate validity information about access-granted banks and access-refused banks and may transmit the validity information to the master devices.

Figure 2:
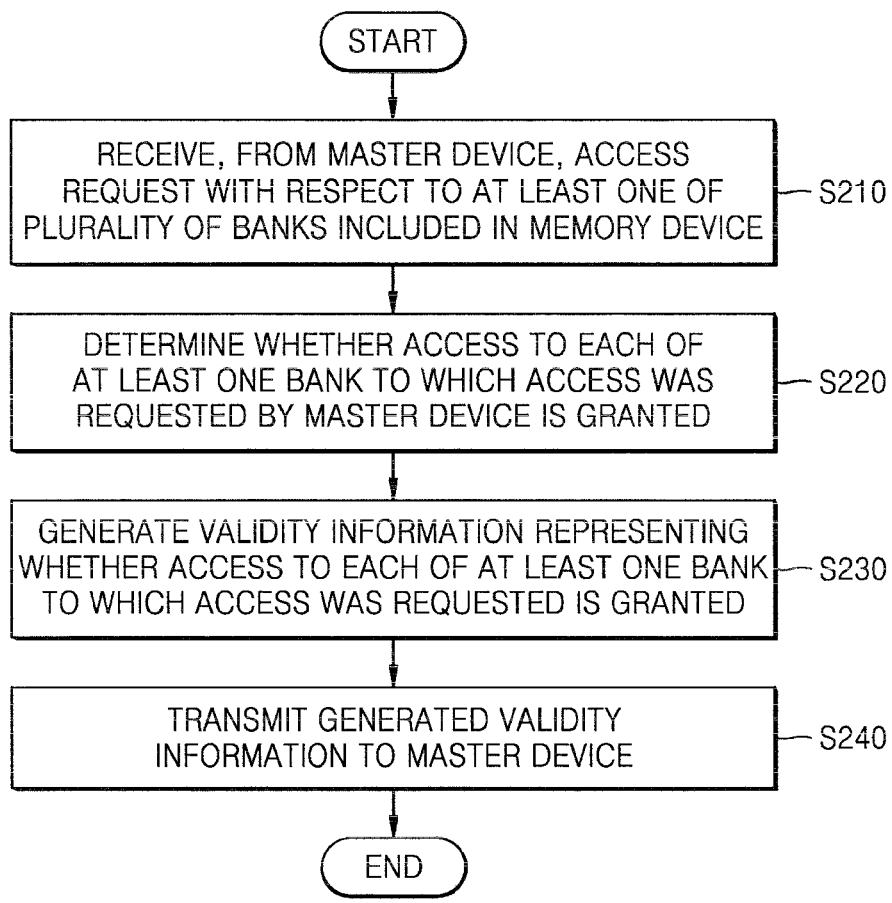
FIG. 2 is a flowchart of a method in which a memory device controls access of a master device, according to an embodiment of the present invention.

FIG. 2 is a flowchart of a method in which a memory device controls access of a master device, according to an embodiment of the present invention.

In operation S210, the memory device 100 may receive, from a master device 200, an access request with respect to at least one of the plurality of banks included in the memory device 100.

According to an embodiment of the present invention, the memory device 100 may include a plurality of banks. Each bank is a unit of a data processing region that forms the memory device 100, and thus the memory device 100 may process data by using at least one bank. For example, the memory device 100 may process data by using one bank or by using two banks.

According to an embodiment of the present invention, the memory device 100 may receive an access request from a master device 200. The master device 200 refers to a device that is connected to the memory device 100 to transmit or receive data to or from the memory device 100. For example, the master device 200 may include, but is not limited to, a processor core, a direct mode access controller, or a hardware (H/W) accelerator.

According to an embodiment of the present invention, the master device 200 may request access to the plurality of banks included in the memory device 100 in order to process data. The master device 200 may designate at least one bank included in the memory device 100 and request access to the at least one bank. For example, when the memory device 100 includes a first bank, a second bank, a third bank, . . . , and an N-th bank, the master device 200 may request access to the first bank, the second bank, and the third bank. Alternatively, the master device 200 may request access to the second bank and the third bank, but embodiments are not limited thereto.

According to an embodiment of the present invention, the memory device 100 may receive a partial access request from the master device 200. The partial access request means that, when at least one of a plurality of banks to which access is requested is accessible, granting access to the accessible bank is requested and information about banks to which access is granted and banks to which access is not granted is requested.

The memory device 100 may receive a partial access request together with or separately from an access request. In response to an access request signal, the memory device 100 may determine that a partial access request has also been received. However, embodiments are not limited thereto, and the partial access request may be received in various other forms.

In operation S220, the memory device 100 may determine whether access to each of at least one bank to which access was requested by the master device 200 is granted.

According to an embodiment of the present invention, the memory device 100 may grant access of the master device 200, based on the access request of the master device 200. For example, when the master device 200 has requested access to at least one bank but bank conflict has not occurred, the memory device 100 may grant the access of the master device 200. The bank conflict occurs when a plurality of master devices request access to at least one same bank, which may lead to reduction in memory performance.

According to an embodiment of the present invention, when the memory device 100 has received access requests from the master device 200, the memory device 100 may determine whether bank conflict occurs.

For example, when at least one bank to which access was requested by the first master device 215 includes a first bank and at least one bank requested to be accessed by the second master device 225 includes the first bank, bank conflict may occur.

According to an embodiment of the present invention, when bank conflict has occurred, the memory device 100 may determine priorities of the access requests. For example, based on preset priorities, the type of master devices that requested access to banks, the degrees of urgency of access requests, the amounts of data stored in buffers included in the master devices that requested access to banks, or a combination thereof, the memory device 100 may determine the priorities of the access requests. However, embodiments are not limited thereto, and the priorities of the access requests may be determined in various other methods.

According to an embodiment of the present invention, when bank conflict has occurred, the memory device 100 may determine the priorities of the access requests, based on urgency levels received from the master devices. The master device 200 may determine an urgency level by using a data retention situation of a buffer included in the master device 200, a usage time of data processed by a bank to which access was requested, or a combination of these factors, but embodiments are not limited thereto.

For example, when the time for the master device 200 to use processed data is imminent, the master device 200 may determine an urgency level of an access request to be high, and the memory device 100 may determine the access request having a high urgency level to have a high priority.

According to an embodiment of the present invention, when bank conflict has occurred among access requests of a plurality of master devices, the memory device 100 may grant access according to an access request having a high priority.

For example, when bank conflict has occurred between an access request of the first master device 215 and an access request of the second master device 225 and the access request of the first master device 215 has a higher priority than the access request of the second master device 225, the memory device 100 may grant access by the first master device 215.

According to an embodiment of the present invention, when bank conflict has occurred due to access requests received from a plurality of master devices, the memory device 100 may determine whether a partial access request has been received in relation to an access request having a lower priority.

For example, when bank conflict has occurred between an access request of the first master device 215 and an access request of another master device and the access request of the first master device 215 has a low priority than the access request of the other master device, the memory device 100 may determine whether a partial access request has been received from the first master device 215.

According to an embodiment of the present invention, when the memory device 100 has received a partial access request for the access request having a low priority, the memory device 100 may determine whether access is granted to each of a plurality of banks to which access is requested, based on the determined priorities.

For example, when bank conflict has occurred between the access request of the first master device 215 and the access request of the second master device 225, the access request of the first master device 215 has a lower priority than the access request of the second master device 225, and a partial access request has been received from the first master device 215, the memory device 100 may determine whether access to each of a plurality of banks access-requested by the first master device 215 is granted.

In operation S230, the memory device 100 may generate validity information representing whether access to each of the at least one bank to which access was requested is granted.

According to an embodiment of the present invention, the memory device 100 may generate validity information representing whether access to each of the at least one bank to which access was requested is granted. For example, when the memory device 100 has received an access request with respect to the first, second, and third banks from the master device 200, the memory device 100 may determine whether access to each of the first, second, and third banks is granted, and may generate validity information based on a result of the determination.

For example, the memory device 100 may generate validity information including information about banks to which access was granted and information about banks to which access was refused. The validity information may be a signal of 2 to 8 bits, but embodiments are not limited thereto.

The number of bits of a validity information signal representing the validity information may be equal to or less than the number of at least one bank to which access was requested. For example, when the memory device 100 has received an access request with respect to the first and second banks from the master device 200, the validity information signal may be a signal of two bits respectively representing whether access to the first bank and access to the second bank are granted. The validity information signal may be a signal of one bit representing whether access to both the first and second banks is possible.

The number of bits of the validity information signal representing the validity information may be greater than the number of at least one bank to which access was requested. For example, when the memory device 100 has received an access request with respect to the first bank from the master device 200, the validity information signal may be a signal of two bits. In this case, the two bits may represent the same information. The memory device 100 may maintain compatibility by using two bits representing the same information.

In operation S240, the memory device 100 may transmit, to a mater device, the validity information representing whether access to each of the at least one bank to which access was requested is granted.

According to an embodiment of the present invention, the memory device 100 may transmit a response signal with respect to the access request received from the master device 200.

For example, when the memory device 100 has granted access to a bank to which access was requested, the memory device 100 may transmit a "grant" signal representing that access is granted to the master device 200.

When the memory device 100 has granted access to some of a plurality of banks to which access was requested, the memory device 100 may transmit a "grant" signal representing that access is granted to the master device 200.

When the memory device 100 has granted access to some of a plurality of banks to which access was requested, the memory device 100 may also transmit validity information that correspond to information about banks to which access was granted and information about banks to which access was refused.

For example, when the memory device 100 has granted access to a first bank from among first, second, and third banks to which access was requested and has refused access to the second and third banks, the memory device 100 may transmit to the master device 200 a "grant" signal representing that access to some of the first, second, and third banks to which access was requested has been granted. The memory device 100 may also transmit to the master device 200 validity information representing that access to the first bank has been granted and access to the second and third banks has been refused.

Figure 3:
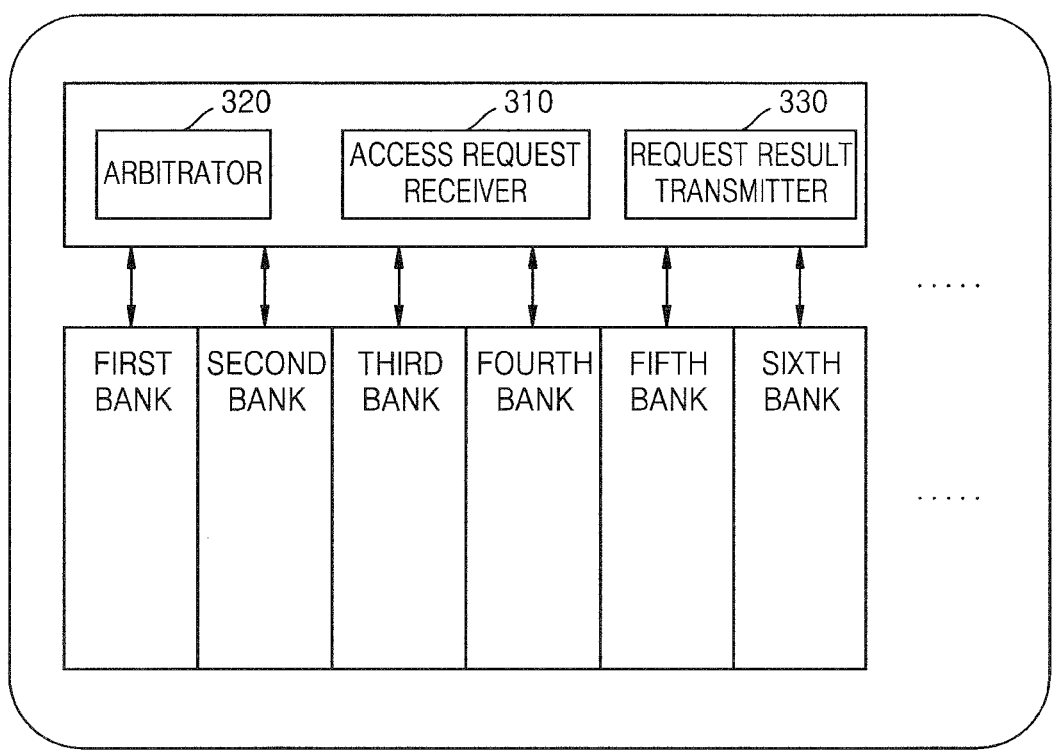
FIG. 3 is a block diagram for describing a memory device according to an embodiment of the present invention.

FIG. 3 is a block diagram for describing a memory device according to an embodiment of the present invention.

According to an embodiment of the present invention, a memory device 100 may include a plurality of banks. The memory device 100 may include an arbitrator 320, an access request receiver 310, and a request result transmitter 330. The arbitrator 320, the access request receiver 310, and the request result transmitter 330 of the memory device 100 may be implemented as a single processor. Alternatively, the arbitrator 320, the access request receiver 310, and the request result transmitter 330 of the memory device 100 may be implemented as individual processors, and embodiments are not limited thereto.

According to an embodiment of the present invention, the access request receiver 310 of the memory device 100 may receive an access request from the master device 200.

According to an embodiment of the present invention, the access request receiver 310 of the memory device 100 may receive a partial access request from the master device 200.

The access request receiver 310 of the memory device 100 may receive the partial access request together with or separately from the access request. In response to an access request signal, the access request receiver 310 of the memory device 100 may determine that a partial access request signal has also been received, but embodiments are not limited thereto. The partial access request may be received in various other forms.

According to an embodiment of the present invention, the arbitrator 320 of the memory device 100 may grant access of the master device 200, based on the access request of the master device 200. For example, when the master device 200 has requests access to at least one bank but bank conflict has not occurred, the arbitrator 320 of the memory device 100 may grant the access to the at least one bank by the master device 200.

According to an embodiment of the present invention, when the arbitrator 320 of the memory device 100 has received access requests from the master device 200, the arbitrator 320 of the memory device 100 may determine whether bank conflict occurs.

For example, when at least one bank to which access was requested by the first master device 215 includes a first bank and at least one bank to which access was requested by the second master device 225 includes the first bank, the arbitrator 320 of the memory device 100 may determine that bank conflict has occurred.

According to an embodiment of the present invention, when bank conflict has occurred, the arbitrator 320 of the memory device 100 may determine priorities of the access requests. For example, based on preset priorities, the type of the master device 200 that requested access to banks, the degrees of urgency of access requests, the amounts of data stored in buffers included in the master device 200 that requested access to banks, or a combination thereof, the arbitrator 320 of the memory device 100 may determine the priorities of the access requests. However, embodiments are not limited thereto, and the priorities of the access requests may be determined via various other methods.

According to an embodiment of the present invention, when bank conflict has occurred, the arbitrator 320 of the memory device 100 may determine the priorities of the access requests, based on urgency levels.

For example, when the time for the master device 200 to use processed data is imminent, the master device 200 may determine an urgency level of an access request to be high, and the arbitrator 320 of the memory device 100 may determine the access request having a high urgency level to have a high priority.

According to an embodiment of the present invention, when bank conflict has occurred among access requests of a plurality of master devices, the arbitrator 320 of the memory device 100 may grant access to an access request having a high priority.

For example, when bank conflict has occurred between an access request of the first master device 215 and an access request of the second master device 225 and the access request of the first master device 215 has a higher priority than the access request of the second master device 225, the memory device 100 may grant access by the first master device 215.

According to an embodiment of the present invention, when bank conflict has occurred due to access requests received from a plurality of master devices, the arbitrator 320 of the memory device 100 may determine whether a partial access request has been received for an access request having a lower priority.

For example, when bank conflict has occurred between an access request of the first master device 215 and an access request of another master device and the access request of the first master device 215 has a lower priority than the access request of the other master device, the arbitrator 320 of the memory device 100 may determine whether a partial access request has been received from the first master device 215.

According to an embodiment of the present invention, when the arbitrator 320 of the memory device 100 has received a partial access request for the access request having a low priority, the arbitrator 320 of the memory device 100 may determine whether access to each of at least one bank to which access was requested is granted, based on the determined priorities.

For example, when bank conflict has occurred between the access request of the first master device 215 and the access request of the second master device 225, the access request of the first master device 215 has a lower priority than the access request of the second master device 225, and a partial access request has been received from the first master device 215, the arbitrator 320 of the memory device 100 may determine whether access to each of at least one bank to which access was requested by the first master device 215 is granted.

According to an embodiment of the present invention, the arbitrator 320 of the memory device 100 may generate validity information representing whether access to each of at least one bank to which access was requested is granted. For example, when the access request receiver 310 of the memory device 100 has received an access request with respect to the first, second, and third banks from the master device 200, the arbitrator 320 of the memory device 100 may determine whether access to each of the first, second, and third banks is granted, and may generate validity information based on a result of the determination.

For example, the memory device 100 may generate validity information including information about access-granted banks and information about banks to which access was refused. The validity information may be a signal of 2 to 8 bits, and embodiments are not limited thereto.

According to an embodiment of the present invention, the request result transmitter 330 of the memory device 100 may transmit a response signal with respect to the access request received from the master device 200.

For example, when the arbitrator 320 of the memory device 100 has granted access to an bank to which access was granted, the request result transmitter 330 of the memory device 100 may transmit a "grant" signal representing that access is granted to the master device 200.

When the arbitrator 320 of the memory device 100 has granted access to some of a plurality of banks to which access was granted, the request result transmitter 330 of the memory device 100 may transmit a "grant" signal representing that access is granted to the master device 200.

When the arbitrator 320 of the memory device 100 has granted access to some of a plurality of banks to which access was granted, the request result transmitter 330 of the memory device 100 may also transmit validity information representing access-granted banks and access-refused banks to the master device 200.

For example, when the arbitrator 320 of the memory device 100 has granted access to a first bank from among first, second, and third banks to which access was granted and has refused access to the second and third banks, the request result transmitter 330 of the memory device 100 may transmit to the master device 200 a "grant" signal representing that the access to the first bank has been granted. The request result transmitter 330 of the memory device 100 may also transmit to the master device 200 validity information representing that access to the first bank has been granted and access to the second and third banks has been refused.

Figure 4:
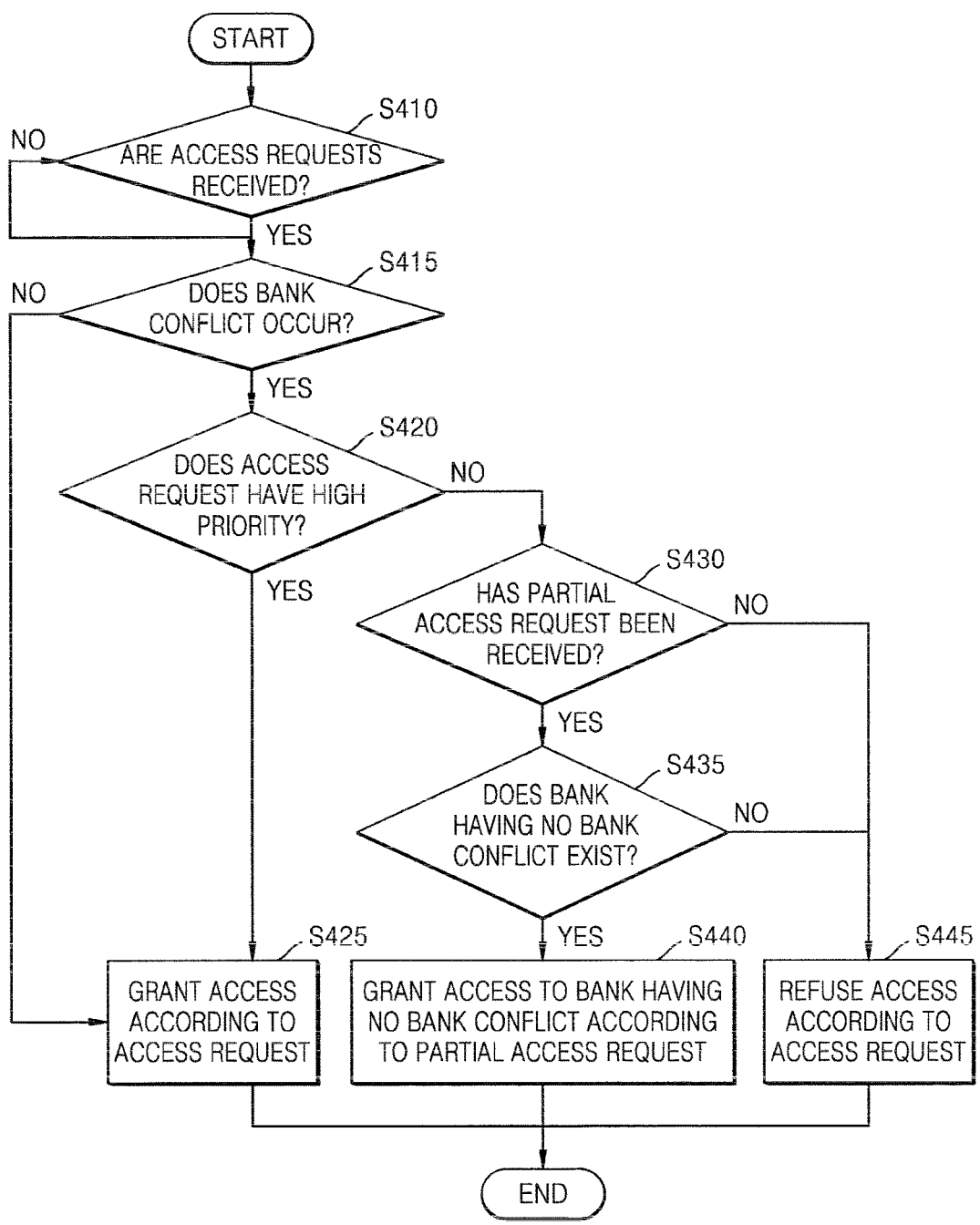
FIG. 4 is a flowchart of a method in which the memory device 100 grants access of the master device 200, according to an embodiment of the present invention.

FIG. 4 is a flowchart of a method in which the memory device 100 grants access of a master device 200, according to an embodiment of the present invention.

In operation S410, the memory device 100 may receive access requests from master devices.

According to an embodiment of the present invention, the memory device 100 may be connected to a plurality of master devices. The memory device 100 may receive, from the plurality of master devices, access requests with respect to at least one of a plurality of banks included in the memory device 100.

According to an embodiment of the present invention, the master device 200 may request access to the plurality of banks included in the memory device 100 in order to process data. The master device 200 may designate at least one bank included in the memory device 100 and request access to the at least one bank. For example, when the memory device 100 includes a first bank, a second bank, a third bank, . . . , and an N-th bank, the master device 200 may request access to the first bank, the second bank, and the third bank. Alternatively, the master device 200 may request access to the second bank and the third bank, but embodiments are not limited thereto.

In operation S415, the memory device 100 may determine whether bank conflict occurs among the access requests.

According to an embodiment of the present invention, the memory device 100 may determine whether bank conflict occurs between an access request received from the first master device 215 and an access request received from the second master device 225. The bank conflict occurs when a plurality of master devices request access to at least one same bank, which may lead to a reduction in the performance of memory.

For example, when at least one bank to which access was requested by the first master device 215 includes a first bank and at least one bank requested to be accessed by the second master device 225 includes the first bank, the memory device 100 may determine that bank conflict has occurred.

In operation S420, the memory device 100 may determine an access request having a high priority.

According to an embodiment of the present invention, when bank conflict has occurred, the memory device 100 may determine priorities of the access requests. For example, based on preset priorities, the type of the master device 200 that requested access to banks, the degrees of urgency of access requests, the amounts of data stored in buffers included in the master device 200 that requested access to banks, or a combination thereof, the memory device 100 may determine the priorities of the access requests. However, embodiments are not limited thereto, and the priorities of the access requests may be determined in various other methods.

In operation S425, the memory device 100 may grant access according to the access request of the master device 200.

According to an embodiment of the present invention, the memory device 100 may grant access according to the access request of the master device 200. For example, when master devices have requested access to at least one bank but bank conflict has not occurred between the access requests, the memory device 100 may grant the accesses of the master devices.

According to an embodiment of the present invention, when bank conflict has occurred among access requests of a plurality of master devices, the memory device 100 may grant access according to an access request having a high priority.

For example, when bank conflict has occurred between an access request of the first master device 215 and an access request of the second master device 225 and the access request of the first master device 215 has a higher priority than the access request of the second master device 225, the memory device 100 may grant access by the first master device 215.

In operation S430, when bank conflict has occurred due to the access requests of the master devices, the memory device 100 may determine whether a partial access request has been received from the master device 200 that transmitted an access request having a lower priority.

According to an embodiment of the present invention, when bank conflict has occurred due to access requests received from a plurality of master devices, the memory device 100 may determine whether a partial access request has been received from a master device 200 that transmitted an access request having a lower priority.

For example, when bank conflict has occurred between an access request of the first master device 215 and an access request of another master device and the access request of the first master device 215 has a lower priority than the access request of the other master device, the memory device 100 may determine whether a partial access request signal has been received from the first master device 215.

The memory device 100 may receive a partial access request together with or separately from an access request. In response to an access request signal, the memory device 100 may determine that a partial access request has also been received. However, embodiments are not limited thereto, and the partial access request may be received in various other forms.

In operation S435, when the memory device 100 has received the partial access request for the access request having a lower priority, the memory device 100 may determine whether bank conflict has occurred with respect to each of at least one access-requested bank.

According to an embodiment of the present invention, the memory device 100 may determine whether bank conflict has occurred with respect to each of the at least one access-requested bank.

For example, when the memory device 100 has received an access request with respect to the first, second, and third banks from a master device 200, the memory device 100 may determine whether bank conflict occurs between the access request and another access request with respect to each of the first, second, and third banks.

In operation S440, the memory device 100 may grant access to a bank having no bank conflict from among the at least one access-requested bank.

According to an embodiment of the present invention, when the memory device 100 has received the partial access request, the memory device 100 may grant access to at least one accessible bank from among the at least one access-requested bank.

For example, the memory device 100 may grant access to a bank having no bank conflict from among the at least one bank to which access was requested by the master device 200 that transmitted an access request.

In operation S445, the memory device 100 may refuse access according to the access request of the master device 200

According to an embodiment of the present invention, when bank conflict has occurred due to the access requests of the plurality of master devices and no partial access requests have been received for the access request having a lower priority, the memory device 100 may refuse access according to the access request having a lower priority.

For example, when bank conflict has occurred between the access request of the first master device 215 and the access request of the second master device 225 and no partial access requests have not been received for the access request of the first master device 215 having a lower priority than the access request of the second master device 225, the memory device 100 may refuse access according to the access request of the first master device 215.

According to an embodiment of the present invention, when bank conflict has occurred due to the access requests of the plurality of master devices and a partial access request has been received from the master device 200 that transmitted an access request having a lower priority, the memory device 100 may partially refuse access according to the access request having a lower priority.

For example, the memory device 100 may refuse access to a bank having bank conflict from among the at least one bank access-requested by the master device 200 that transmitted an access request.

Figure 5:
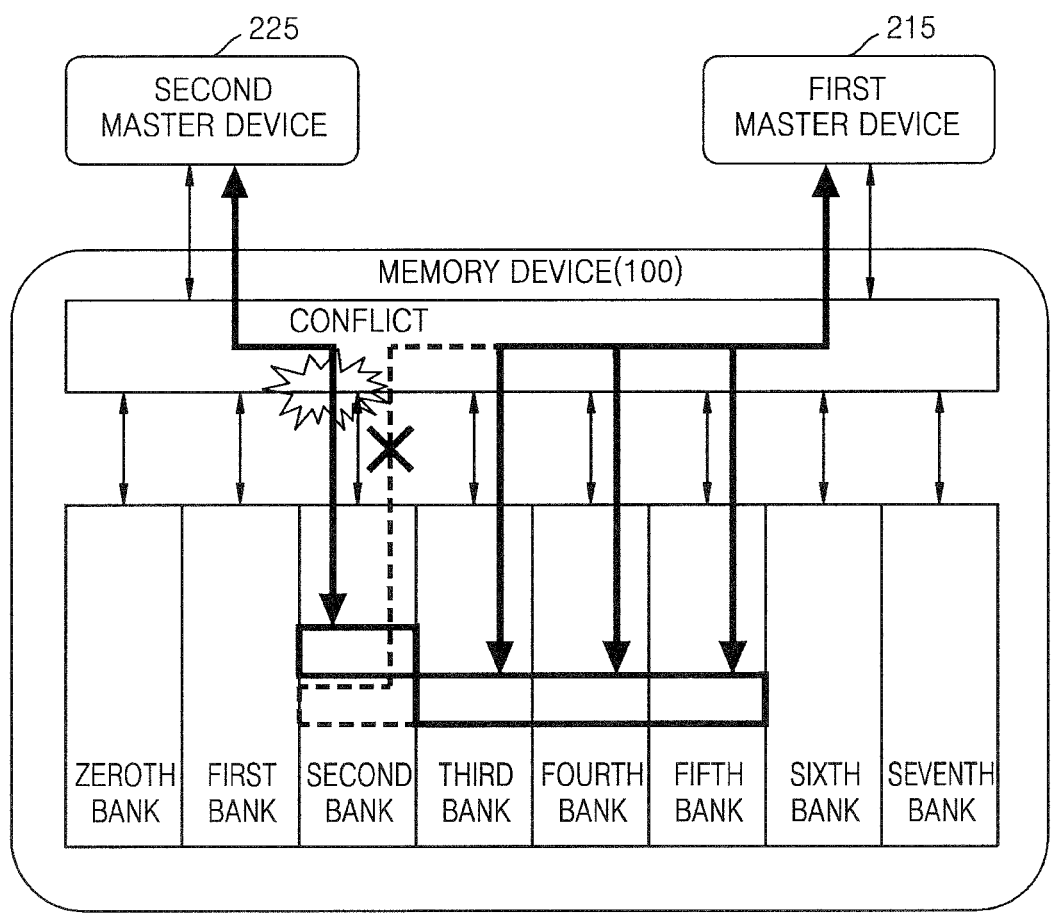
FIG. 5 is a block diagram for describing a method in which, when bank conflict has occurred, the memory device 100 grants access, according to an embodiment of the present invention.

FIG. 5 is a block diagram for describing a method in which, when bank conflict has occurred, the memory device 100 grants access, according to an embodiment of the present invention.

Referring to FIG. 5, the first master device 215 and the second master device 225 may simultaneously request access to at least one bank included in the memory device 100. For example, the second master device 225 may request access to a second bank, and the first master device 215 may request access to second, third, fourth, and fifth banks.

According to an embodiment of the present invention, when the memory device 100 has received access requests from a plurality of master devices, the memory device 100 may determine whether bank conflict occurs.

For example, when the memory device 100 has received an access-request with respect to the second, third, fourth, and fifth banks from the first master device 215 and an access request with respect to the second bank from the second master device 225, the memory device 100 may determine that bank conflict has occurred.

According to an embodiment of the present invention, when bank conflict has occurred, the memory device 100 may determine priorities of the access requests. For example, the memory device 100 may determine priorities of the access request of the first master device 215 and the access request of the second master device 225 that caused the bank conflict.

For example, based on preset priorities, the types of the first and second master devices 215 and 225, the degrees of urgency of access requests, the amounts of data stored in buffers included in the first and second master devices 215 and 225, or a combination thereof, the memory device 100 may determine the priorities of the access requests. However, embodiments are not limited thereto, and the priorities of the access requests may be determined via various other methods.

According to an embodiment of the present invention, the memory device 100 may grant access of the master device 200, based on the determined priorities.

For example, the memory device 100 may grant access according to the access request of the second master device 225 having a higher priority from among the access requests between which bank conflict has occurred.

According to an embodiment of the present invention, when bank conflict has occurred due to the access requests of master devices, the memory device 100 may determine whether a partial access request has been received from a master device 200 that transmitted an access request having a lower priority.

For example, the memory device 100 may determine whether a partial access request has been received from the first master device 215 that transmitted an access request having a lower priority from among the access requests between which bank conflict has occurred.

According to an embodiment of the present invention, when the memory device 100 has received a partial access request from the master device 200 that transmitted an access request having a lower priority, the memory device 100 may determine whether bank conflict has occurred with respect to each of the at least one access-requested bank.

For example, when the memory device 100 has received a partial access request from the first master device 215 that transmitted an access request having a lower priority than the access request of the second master device 225, the memory device 100 may determine whether bank conflict has occurred with respect to the second, third, fourth, and fifth banks to which access was requested by the first master device 215.

According to an embodiment of the present invention, in response to partial access request, the memory device 100 may grant access to a bank having no bank conflict from among the at least one access-requested bank.

For example, the memory device 100 may grant access to the third, fourth, and fifth banks having no bank conflict from among the at least one bank to which access was requested by the first master device 215, except the second bank having bank conflict.

According to an embodiment of the present invention, the memory device 100 may transmit a response signal with respect to the access request received from the master device 200.

For example, when the memory device 100 has granted access to a bank to which access was requested, the memory device 100 may transmit a "grant" signal representing that access is granted to the master device 200.

When the memory device 100 has granted access to some of a plurality of banks to which access was requested, the memory device 100 may transmit a "grant" signal representing that access is granted to the master device 200.

When the memory device 100 has granted access to some of a plurality of banks to which access was requested, the memory device 100 may also transmit validity information representing banks to which access was granted and banks to which access was refused.

For example, when the memory device 100 has granted access to a first bank from among first, second, and third banks to which access was granted and has refused access to the second and third banks, the memory device 100 may transmit to the master device 200 a "grant" signal representing that the access to the first bank has been granted. The memory device 100 may also transmit to the master device 200 validity information representing that access to the first bank has been granted and access to the second and third banks has been refused.

Figure 6:
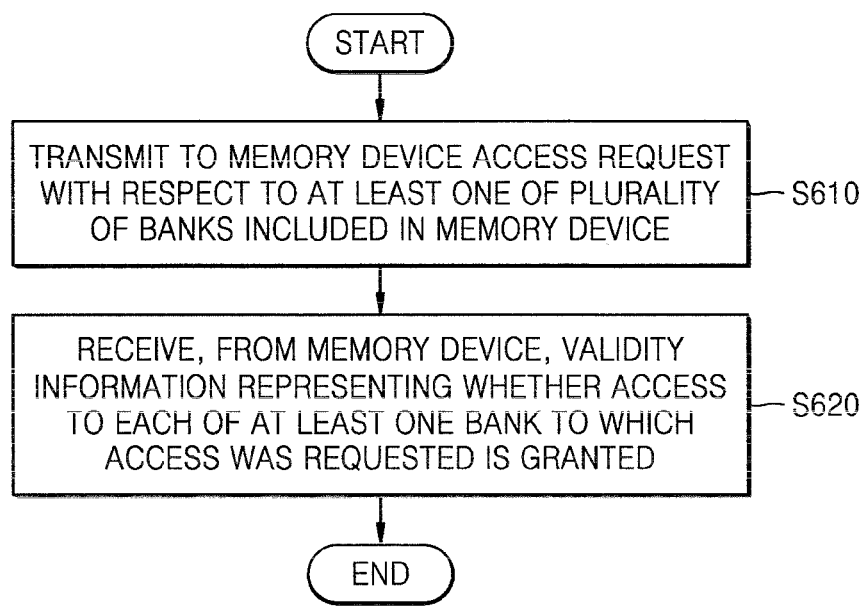
FIG. 6 is a flowchart of a method in which a master device 200 accesses the memory device 100, according to an embodiment of the present invention.

FIG. 6 is a flowchart of a method in which a master device 200 accesses the memory device 100, according to an embodiment of the present invention.

In operation S610, the master device 200 may request at least one of a plurality of banks included in the memory device 100 to be accessed.

According to an embodiment of the present invention, the master device 200 may request at least one of the plurality of banks included in the memory device 100 to be accessed. The master device 200 may transmit a partial access request to the memory device 100, together with or separately from the access request.

For example, the master device 200 may request first, second, and third banks from among the plurality of banks included in the memory device 100 to be accessed. When some of the first, second, and third banks are accessible, the master device 200 may transmit, together with the access request, a partial access request of requesting the memory device 100 to grant access to the accessible banks and requesting validity information corresponding to information about the accessible banks and inaccessible banks, to the memory device 100.

In operation S620, the master device 200 may receive, from the memory device 100, validity information corresponding to information about an accessible bank and an inaccessible bank from among the at least one bank to which access was requested.

According to an embodiment of the present invention, the master device 200 may receive validity information. The master device 200 may obtain information about an access-granted bank and an access-refused bank from the validity information.

According to an embodiment of the present invention, the master device 200 may transmit data about the access-granted bank and request processing of the data. For example, the master device 200 may transmit data to the access-granted bank and request processing of the data, based on the validity information. The master device 200 may receive processed data from the access-granted bank and store the processed data.

According to an embodiment of the present invention, the master device 200 may re-transmit an access request with respect to the access-refused bank. For example, the master device 200 may re-transmit an access request with respect to the access-refused bank from among the at least one bank to which access was requested. When access to the bank to which access was refused is granted, the master device 200 may stop re-transmitting the access request to the bank to which access was refused.

According to an embodiment of the present invention, when the re-transmitted access request with respect to the bank to which access was refused is granted, the master device 200 may transmit data about the bank to which access was granted according to the re-transmitted access request and may request processing of the data. The master device 200 may also receive and store processed data.

Figure 7:
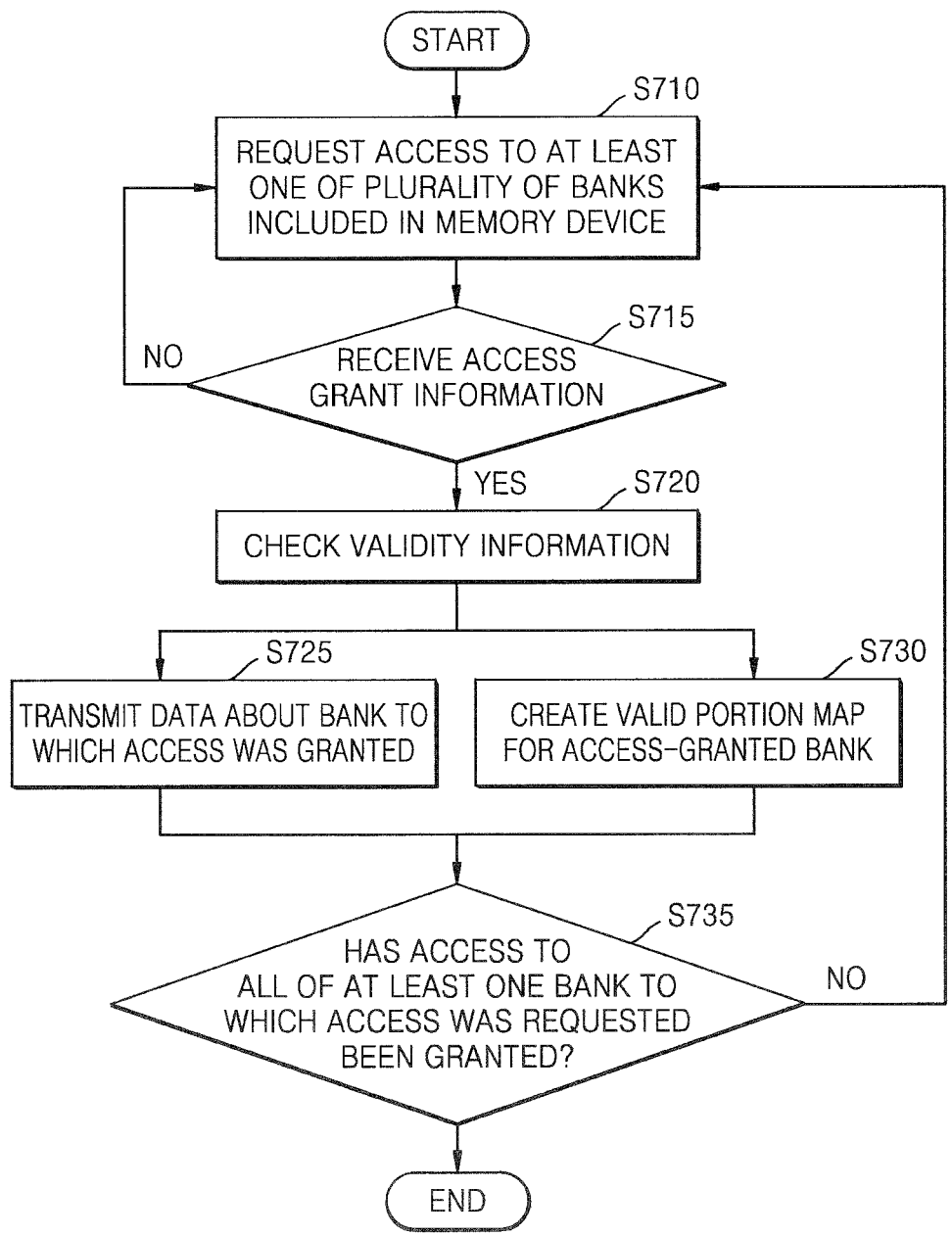
FIG. 7 is a flowchart of a method in which a master device 200 accesses the memory device 100, according to an embodiment of the present invention.

FIG. 7 is a flowchart of a method in which a master device 200 accesses the memory device 100, according to an embodiment of the present invention.

In operation S710, the master device 200 may request at least one of a plurality of banks included in the memory device 100 to be accessed. The master device 200 may transmit a partial access request to the memory device 100, together with or separately from the access request.

For example, the master device 200 may request first, second, and third banks from among the plurality of banks included in the memory device 100 to be accessed. When some of the first, second, and third banks are accessible, the master device 200 may transmit, together with the access request, a partial access request of requesting the memory device 100 to grant access to the accessible banks and requesting validity information corresponding to information about the accessible banks and inaccessible banks, to the memory device 100.

In operation S715, the master device 200 may receive access grant information. For example, when the memory device 100 has granted access to a bank to which access was requested, the master device 200 may receive a "grant" signal representing that access is granted from the memory devices 100.

When the memory device 100 has granted access to some of a plurality of banks to which access was requested, the master device 200 may receive a "grant" signal representing that access is granted from the memory devices 100.

In operation S720, when the master device 200 has received the access grant information, the master device 200 may check validity information received together with or separately from the access grant information. The master device 200 may obtain information about an access-granted bank and an access-refused bank from the validity information.

In operation S725, the master device 200 may transmit data about the bank to which access was granted and request processing of the data. For example, the master device 200 may transmit data to the bank to which access was granted and request processing of the data, based on the validity information. The master device 200 may receive processed data from the bank to which was granted and store the processed data.

In operation S730, the master device 200 may create a valid portion map for the access-granted bank. For example, when access to only the first bank from among the first, second, and third banks to which access was requested by the master device 200 has been granted, the master device 200 may create a valid portion map indicating that access to the first bank has been granted and access to the second bank and the third bank has not been granted.

In operation S735, the master device 200 may determine whether access to all of the at least one bank to which access was requested has been granted. For example, the master device 200 may determine whether access to all of the at least one bank to which access was requested has been granted, based on the generated valid portion map.

According to an embodiment of the present invention, the master device 200 may re-transmit an access request with respect to the bank to which access was refused. For example, the master device 200 may re-transmit an access request with respect to the bank to which access was refused from among the at least one bank to which access was requested except a bank to which access has been granted, based on the generated valid portion map. When access to the bank to which access was refused is granted, the master device 200 may stop re-transmitting the access request to the bank to which access was refused.

According to an embodiment of the present invention, when the re-transmitted access request to the bank to which access was refused is granted, the master device 200 may transmit data to the bank to which access was granted and may request processing of the data. The master device 200 may also receive and store processed data.

Figure 8:
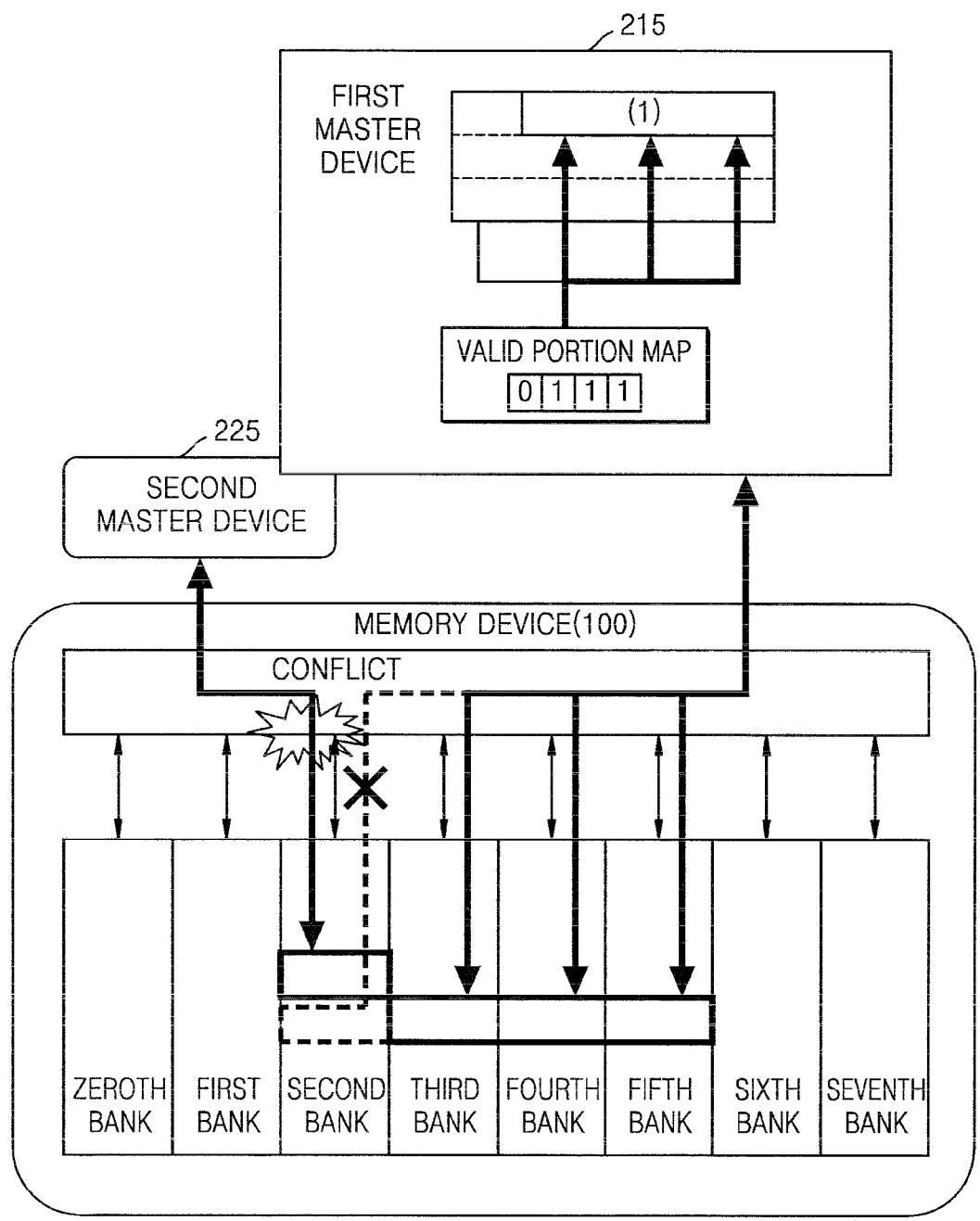
FIG. 8 is a block diagram for describing a method in which a master device 200 receives processed data, according to an embodiment of the present invention.

FIG. 8 is a block diagram for describing a method in which a master device 200 receives processed data, according to an embodiment of the present invention.

According to an embodiment of the present invention, a plurality of master devices may be connected to the memory device 100. The plurality of master devices may respectively transmit access requests with respect to at least one of a plurality of banks included in the memory device 100.

Referring to FIG. 8, the first master device 215 and the second master device 225 may simultaneously request access to at least one bank included in the memory device 100. For example, the second master device 225 may request access to a second bank, and the first master device 215 may request access to second, third, fourth, and fifth banks.

The master device 200 may transmit partial access requests to the memory device 100, together with or separately from the access requests.

For example, the first master device 215 may request the second, third, fourth, and fifth banks from among the plurality of banks included in the memory device 100 to be accessed, and may transmit a partial access request to the memory device 100, together with or separately from the access request.

The partial access request of the second master device 225 means that, when only some of the second, third, fourth, and fifth banks are accessible, granting of access to the some accessible banks is requested and information about banks to which access was granted and banks to which access was refused is requested.

According to an embodiment of the present invention, when bank conflict has occurred, the memory device 100 may determine priorities of the access requests. For example, the memory device 100 may determine priorities of the access request of the first master device 215 and the access request of the second master device 225 that caused the bank conflict.

For example, based on preset priorities, the types of the first and second master devices 215 and 225, the degrees of urgency of access requests, the amounts of data stored in buffers included in the first and second master devices 215 and 225, or a combination thereof, the memory device 100 may determine the priorities of the access requests. However, embodiments are not limited thereto, and the priorities of the access requests may be determined in various other methods.

According to an embodiment of the present invention, the memory device 100 may grant access of the master device 200, based on the determined priorities.

For example, the memory device 100 may grant access according to the access request of the second master device 225 having a higher priority from among the access requests between which bank conflict has occurred.

According to an embodiment of the present invention, when bank conflict has occurred due to the access requests of master devices, the memory device 100 may determine whether a partial access request has been received from a master device 200 that transmitted an access request having a lower priority.

For example, the memory device 100 may determine whether a partial access request has been received from the first master device 215 that transmitted an access request having a lower priority from among the access requests between which bank conflict has occurred.

According to an embodiment of the present invention, when the memory device 100 has received a partial access request from the master device 200 that transmitted an access request having a lower priority, the memory device 100 may determine whether bank conflict has occurred with respect to each of the at least one access-requested bank.

For example, when the memory device 100 has received a partial access request from the first master device 215 that transmitted an access request having a lower priority than the access request of the second master device 225, the memory device 100 may determine whether bank conflict has occurred with respect to the second, third, fourth, and fifth banks to which access was requested by the first master device 215.

According to an embodiment of the present invention, in response to partial access request, the memory device 100 may grant access to a bank having no bank conflict from among the at least one bank to which access was requested.

For example, the memory device 100 may grant access to the third, fourth, and fifth banks having no bank conflict from among the at least one bank to which access was requested by the first master device 215.

According to an embodiment of the present invention, the memory device 100 may transmit a response signal with respect to the access request received from the master device 200.

For example, when the memory device 100 has granted access to a bank to which access was requested, the memory device 100 may transmit a "grant" signal representing that access is granted to the master device 200.

When the memory device 100 has granted access to some of a plurality of banks to which access was requested, the memory device 100 may transmit a "grant" signal representing that access is granted to the master device 200.

When the memory device 100 has granted access to some of a plurality of banks to which access was requested, the memory device 100 may also transmit validity information representing banks to which access was granted and banks to which access was refused.

According to an embodiment of the present invention, when the master device 200 has received access grant information, the master device 200 may check validity information received together with or separately from the access grant information. The master device 200 may obtain information about a bank to which access was granted and a bank tow which access was refused from the validity information.

According to an embodiment of the present invention, the master device 200 may create a valid portion map for the bank to which access was granted. For example, referring to FIG. 8, the master device 200 may create a valid portion map indicating that access to the third, fourth, and fifth banks from among the second, third, fourth, and fifth banks to which access was requested by the master device 200 has been granted and access to the second bank has not been granted. In the valid portion map, "1" may be matched with a bank to which access was granted, and "0" may be matched with a bank to which access was refused.

The master device 200 may transmit data about the bank to which access was granted by referring to the valid portion map, and may request processing of the data.

The master device 200 may receive processed data from the bank to which access was granted.

Figure 9:
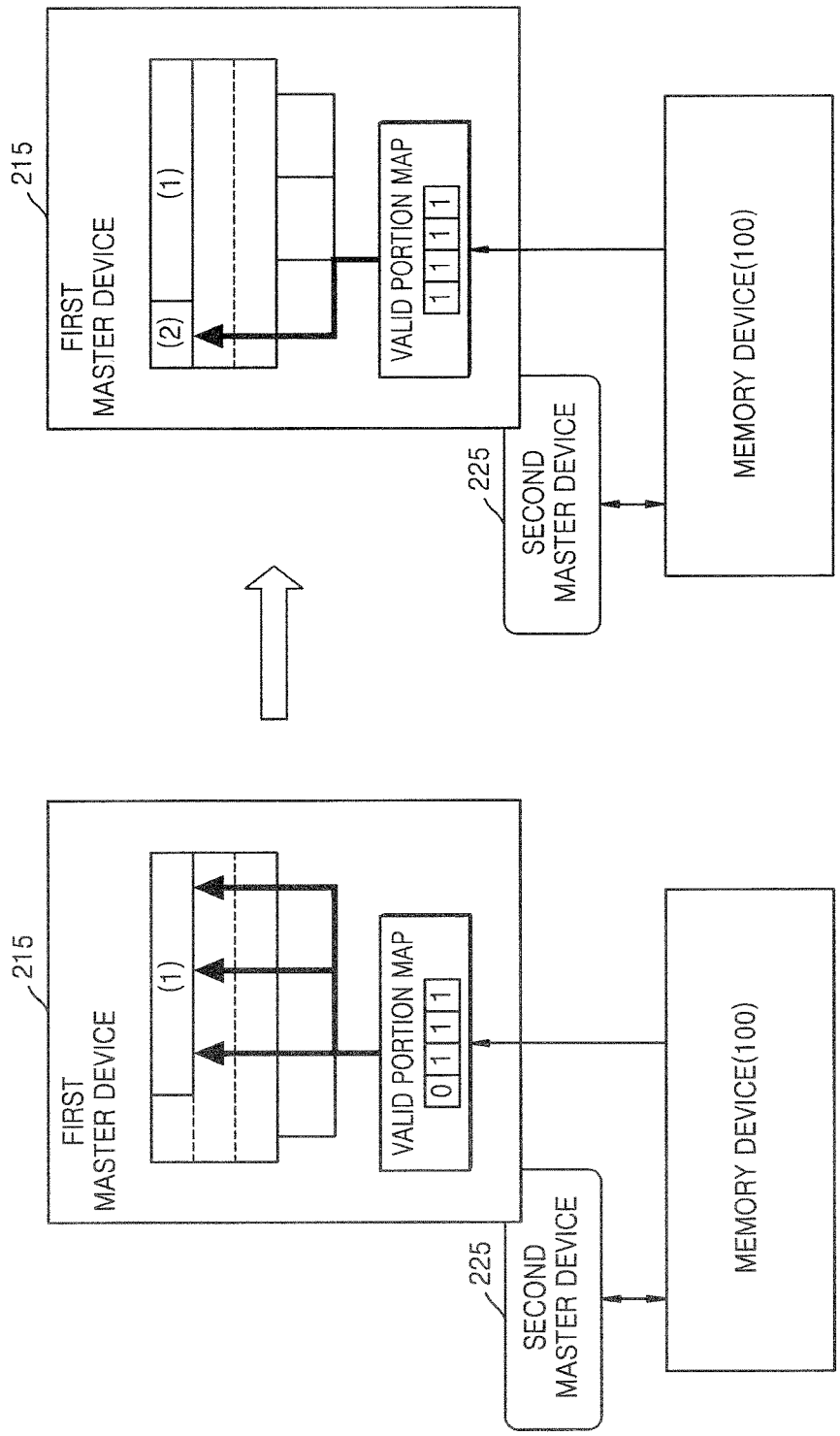
FIG. 9 is a block diagram for describing a method in which a master device 200 re-transmits an access request with respect to an access-refused bank, according to an embodiment of the present invention.

FIG. 9 is a block diagram for describing a method in which a master device 200 re-transmits an access request with respect to bank to which access was refused, according to an embodiment of the present invention.

According to an embodiment of the present invention, the master device 200 may determine whether access to all of the at least one bank to which access was requested has been granted. For example, the master device 200 may determine whether access to all of the at least one bank to which access was requested has been granted, based on a generated valid portion map.

For example, in FIG. 9, "1" in the valid portion map may be matched with an bank to which access was granted, and "0" therein may be matched with bank to which access was refused. The master device 200 may determine whether access to all of the second, third, fourth, and fifth banks to which access was requested has not been granted, by using the valid portion map.

According to an embodiment of the present invention, the master device 200 may re-transmit an access request with respect to the bank to which access was refused. For example, the master device 200 may re-transmit an access request with respect to the bank to which access was refused from among at least one bank to which access was requested, based on the valid portion map.

For example, the master device 200 may re-transmit an access request with respect to a bank matched with "0" of the valid portion map.

According to an embodiment of the present invention, when access to the bank to which access was refused is granted, the master device 200 may correct the valid portion map. For example, when access to the bank matched with "0" of the valid portion map is granted, the master device 200 may correct "0" of the valid portion map to "1".

According to an embodiment of the present invention, when access to the bank to which access was refused is granted in response to re-transmission of an access request, the master device 200 may transmit data about the bank to which access was granted according to the re-transmitted access request and may request processing of the data. The master device 200 may receive the processed data from the bank to which access was granted according to the re-transmitted access request, and may store the received processed data.

According to an embodiment of the present invention, when access to the bank to which access was refused is granted, the master device 200 may stop re-transmission of an access request.

For example, when the valid portion map includes no "0", the master device 200 may stop re-transmission of an access request.

Figure 10:
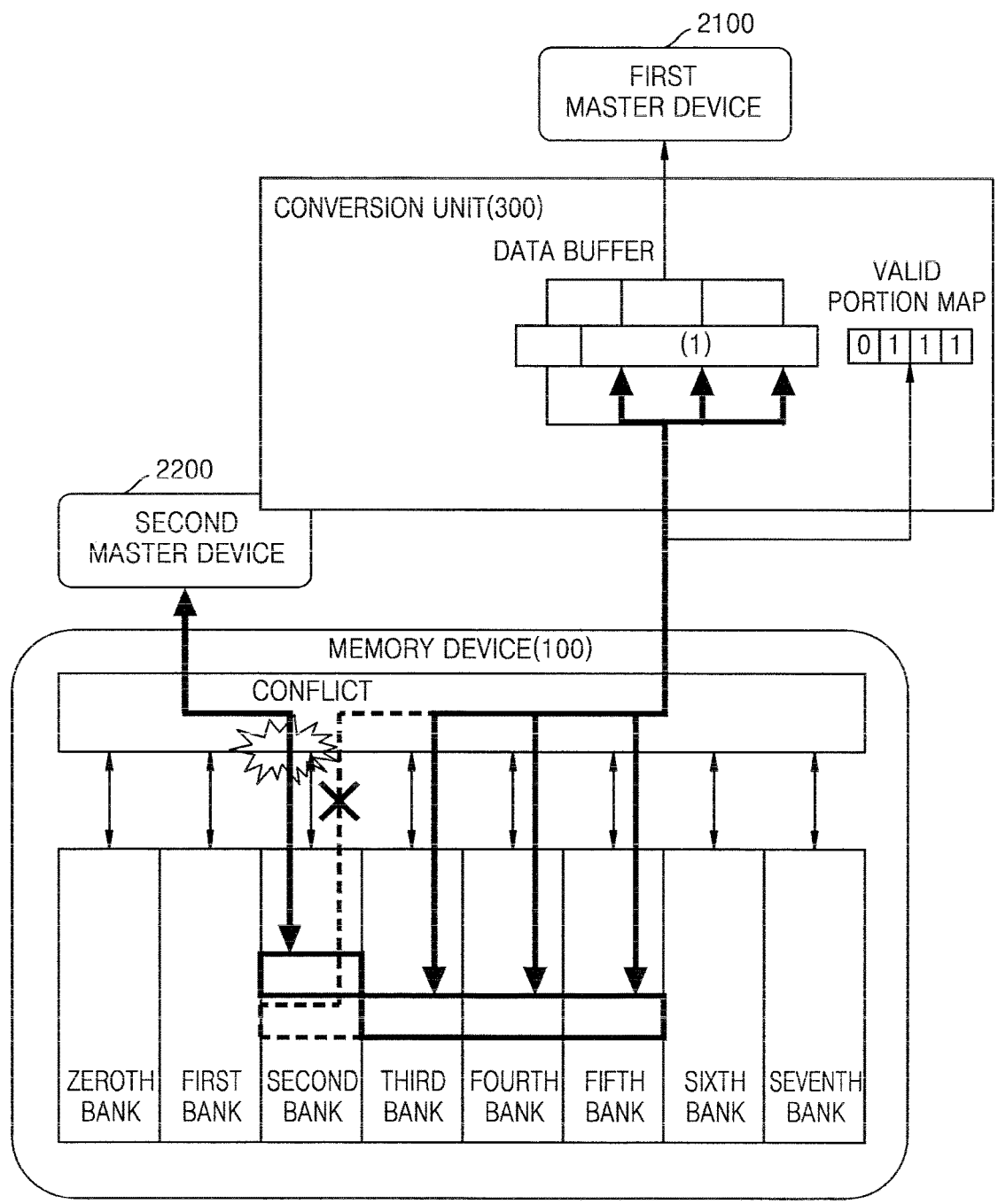
FIG. 10 is a block diagram for describing a conversion unit 300 according to an embodiment of the present invention.

FIG. 10 is a block diagram for describing a conversion unit 300 according to an embodiment of the present invention.

According to an embodiment of the present invention, the conversion unit 300 may be connected between a first master device 2100 and the memory device 100. The conversion unit 300 may be implemented as a separate process from the first master device 2100 and the memory device 100, or may be implemented as the same processor as the first master device 2100 or the memory device 100.

According to an embodiment of the present invention, the conversion unit 300 may be combined with the first master device 2100 to receive an access request of the first master device 2100 with respect to the memory device 100. The conversion unit 300 may convert the access request of the first master device 2100.

For example, the conversion unit 300 may add a partial access request to the access request of the first master device 2100 with respect to the memory device 100.

According to an embodiment of the present invention, the conversion unit 300 may receive access grant information for the access request transmitted to the memory device 100.

For example, the conversion unit 300 may receive a "grant" signal representing that access is granted, from the memory device 100.

The conversion unit 300 may receive validity information representing banks to which access was granted and banks to which access was refused from among banks to which access was requested.

For example, the conversion unit 300 may receive, from the memory device 100, validity information representing that access to the second bank has been refused and access to the third, fourth, and fifth banks has been granted.

According to an embodiment of the present invention, when the conversion unit 300 has received access grant information, the conversion unit 300 may check validity information received together with or separately from the access grant information. The conversion unit 300 may obtain information about the banks to which access was granted and banks to which access was refused from the validity information.

According to an embodiment of the present invention, the conversion unit 300 may create a valid portion map for the banks to which access was granted. For example, referring to FIG. 10, the conversion unit 300 may create a valid portion map indicating that access to the third, fourth, and fifth banks from among the second, third, fourth, and fifth banks to which access was requested has been granted and access to the second bank has not been granted. In the valid portion map, "1" may be matched with a bank to which access was granted, and "0" may be matched with a bank to which access was refused.

The conversion unit 300 may transmit data about the banks to which access was granted by referring to the valid portion map, and may request processing of the data.

The conversion unit 300 may receive processed data from the access-granted banks.

Figure 11:
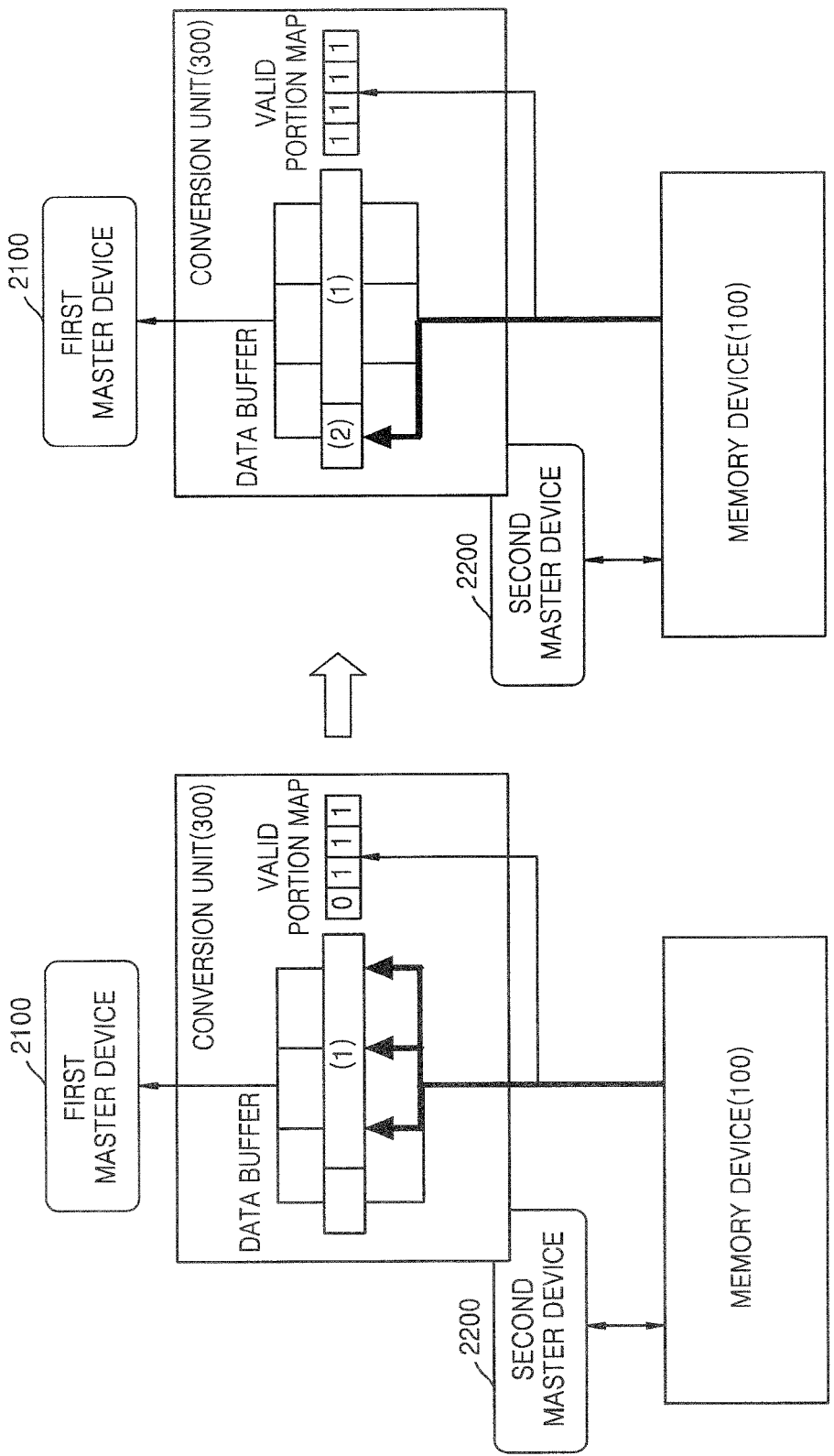
FIG. 11 is a block diagram for describing a method in which the conversion unit 300 re-transmits an access request, according to an embodiment of the present invention.

FIG. 11 is a block diagram for describing a method in which the conversion unit 300 re-transmits an access request, according to an embodiment of the present invention.

According to an embodiment of the present invention, the conversion unit 300 may determine whether access to all of at least one bank to which access was requested has been granted. For example, the conversion unit 300 may determine whether access to all of the at least one bank to which access was requested has been granted, based on a generated valid portion map.

For example, "1" in the valid portion map may be matched with a bank to which access was granted, and "0" therein may be matched with a bank to which access was refused. The conversion unit 300 may determine whether access to some of the second, third, fourth, and fifth banks to which access was requested has not been granted by using the valid portion map.

According to an embodiment of the present invention, the conversion unit 300 may re-transmit an access request to a bank to which access was refused. For example, the conversion unit 300 may re-transmit an access request to the bank to which access was refuses from among the at least one bank to which access was requested except a bank to which access has been granted, based on the valid portion map.

For example, the conversion unit 300 may re-transmit an access request to a bank matched with "0" of the valid portion map.

According to an embodiment of the present invention, when access to the bank to which access was refused is granted, the conversion unit 300 may correct the valid portion map. For example, when access to the bank matched with "0" of the valid portion map is granted, the conversion unit 300 may correct "0" of the valid portion map to "1".

According to an embodiment of the present invention, when access to the bank to which access was refused is granted according to re-transmission of an access request, the conversion unit 300 may transmit data about the bank to which access was granted according to the re-transmitted access request and may request processing of the data. The conversion unit 300 may receive the processed data from the bank to which access was granted according to the re-transmitted access request, and may store the received processed data.

According to an embodiment of the present invention, when access to the bank to which access was refused is granted, the conversion unit 300 may stop re-transmission of an access request. For example, when the valid portion map includes no "0", the conversion unit 300 may stop re-transmission of an access request.

According to an embodiment of the present invention, when the conversion unit 300 has received processed data from all of the at least one bank to which access was requested, the conversion unit 300 may transmit the received processed data to the master device 200.

For example, when the conversion unit 300 has received processed data from the second, third, fourth, and fifth banks of the memory device 100 to which access was requested, the conversion unit 300 may transmit stored data to the first master device 2100.

According to an embodiment of the present invention, when the conversion unit 300 determines based on the valid portion map that access to all of the at least one bank to which access was requested has been granted, the conversion unit 300 may transmit the stored data to the first master device 2100.

For example, when the valid portion map includes no "0", the conversion unit 300 determines that access to all of the at least one bank to which access was requested has been granted, and may transmit the stored data to the first master device 2100.

Figure 12:
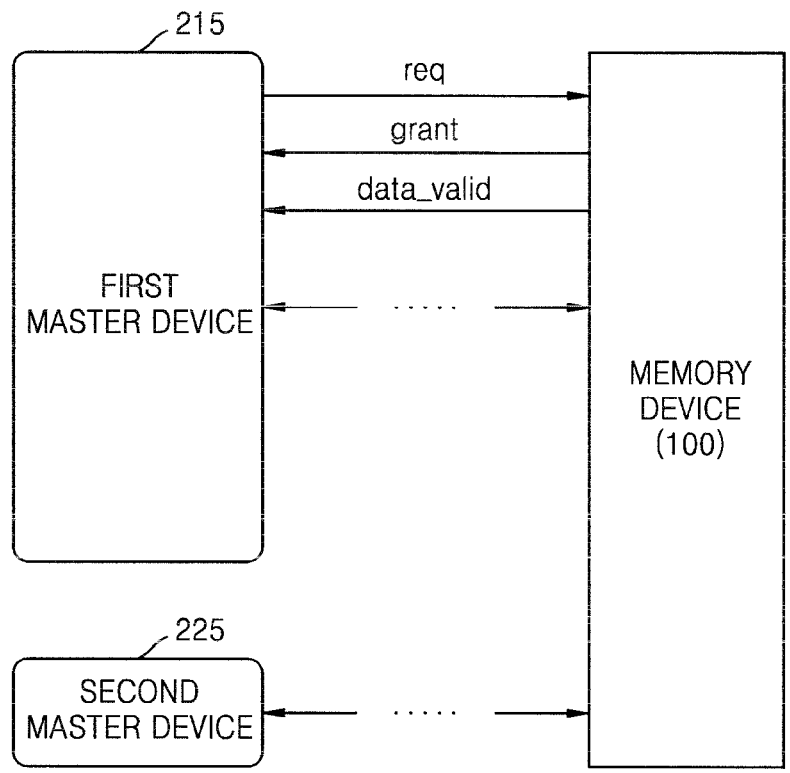
FIG. 12 is a block diagram for describing a method in which a master device 200 transmits an access request signal to the memory device 100, according to an embodiment of the present invention.

FIG. 12 is a block diagram for describing a method in which a master device 200 transmits an access request signal to the memory device 100, according to an embodiment of the present invention.

According to an embodiment of the present invention, the master device 200 may transmit an access request signal req to the memory device 100. The access request signal req may be a 1-bit signal or a 2-bit signal, but embodiments are not limited thereto.

According to an embodiment of the present invention, the access request signal req of the master device 200 may include a partial access request signal. The master device 200 may transmit a partial access request signal to the memory device 100, together with or separately from the access request signal req.

According to an embodiment of the present invention, the memory device 100 may transmit a response signal with respect to the access request signal req.

For example, when access to all of the at least one bank access-requested by the first master device 215 has been granted, the memory device 100 may transmit a "grant" signal representing that access is granted, to the first master device 215. When access to some of the at least one bank access-requested by the first master device 215 has been granted, the memory device 100 may transmit a "grant" signal representing that access is granted to the first master device 215, but embodiments are not limited thereto.

According to an embodiment of the present invention, the memory device 100 may transmit validity information to the first master device 215.

For example, the memory device 100 may transmit to the master device 200 a "data_valid" signal corresponding to information about a bank to which access was granted and a bank to which access was refused from among at least one bank to which access was requested by the master device 200.

The "data_valid" signal may be a signal of two to eight bits, but embodiments are not limited thereto.

The number of bits of the validity information signal data_valid representing the validity information may be equal to or less than the number of at least one bank to which access was requested. For example, when the memory device 100 has received an access request with respect to the first and second banks from the master device 200, the validity information signal data_valid may be a signal of two bits respectively representing whether access to the first bank and access to the second bank are granted. The validity information signal data_valid may be a signal of one bit representing whether access to both the first and second banks is possible.

The number of bits of the validity information signal data_valid representing the validity information may be greater than the number of at least one bank to which access was requested. For example, when the memory device 100 has received an access request with respect to the first bank from the master device 200, the validity information signal data_valid may be a signal of two bits. In this case, the two bits may represent the same information. The memory device 100 may maintain compatibility by using two bits representing the same information.

Figure 13:
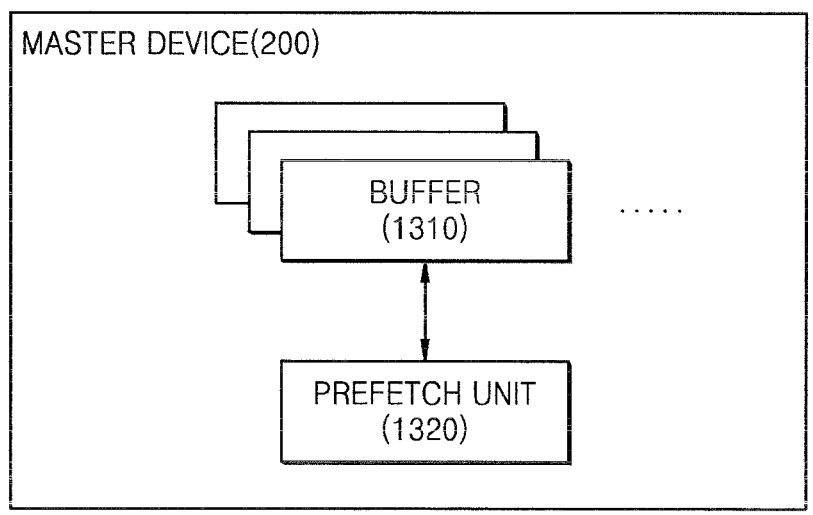
FIG. 13 is a block diagram for describing an operation of a master device 200, according to an embodiment of the present invention.

FIG. 13 is a block diagram for describing an operation of a master device 200, according to an embodiment of the present invention.

According to an embodiment of the present invention, the master device 200 may include a buffer 1310. The master device 200 may include a single buffer 1310 or a plurality of buffers 1310, but embodiments are not limited thereto. The master device 200) may store, in the buffer 1310, data necessary for providing a predetermined function.

The master device 200 may include a prefetch unit 1320. The master device 200 may exchange data with a device outside the master device 200, by using the prefetch unit 1320. For example, the master device 200 may transmit or receive data to or from memory by using the prefetch unit 1320.

According to an embodiment of the present invention, the prefetch unit 1320 of the master device 200 may request at least one of the plurality of banks included in the memory device 100 to be accessed. The prefetch unit 1320 of the master device 200 may transmit a partial access request to the memory device 100, together with or separately from the access request.

For example, the prefetch unit 1320 of the master device 200 may request access to first, second, and third banks from among the plurality of banks included in the memory device 100. When some of the first, second, and third banks are accessible, the prefetch unit 1320 of the master device 200 may transmit to the memory device 100, together with the access request, a partial access request for requesting the memory device 100 to grant access to the accessible banks and requesting validity information corresponding to information about the accessible banks and inaccessible banks.

According to an embodiment of the present invention, the prefetch unit 1320 of the master device 200 may receive validity information. The prefetch unit 1320 of the master device 200 may obtain information about a bank to which access was granted and a bank to which access was refused from the validity information.

According to an embodiment of the present invention, the prefetch unit 1320 of the master device 200 may transmit data about the bank to which access was granted and request processing the data. For example, the prefetch unit 1320 of the master device 200 may transmit data to the bank to which access was granted and request processing the data, based on the validity information. The prefetch unit 1320 of the master device 200 may receive processed data from the bank to which access was granted and store the processed data in the buffer 1310 of the master device 200.

According to an embodiment of the present invention, the prefetch unit 1320 of the master device 200 may retransmit an access request with respect to the bank to which access was refused. For example, the prefetch unit 1320 of the master device 200 may retransmit an access request with respect to the bank to which access was refused from among the at least one bank to which access was requested. When access to the bank to which access was initially refused is granted, the prefetch unit 1320 of the master device 200 may stop retransmitting the access request with respect to the bank to which access was refused.

According to an embodiment of the present invention, when the retransmitted access request with respect to the bank to which access was initially refused is granted, the prefetch unit 1320 of the master device 200 may transmit data about the bank to which access was granted in response to the retransmitted access request and may request processing the data. The prefetch unit 1320 of the master device 200 may receive processed data from the bank to which the access was granted and store the processed data in the buffer 1310 of the master device 200.

The present invention can also be embodied as a storage medium including instruction codes executable by a computer such as a program module executed by the computer. A computer readable medium can be any available medium which can be accessed by the computer and includes all volatile/non-volatile and removable/non-removable media. Further, the computer readable medium may include all computer storage and communication media. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes any information transmission medium.

Although the embodiments of the present disclosure have been disclosed for illustrative purposes, one of ordinary skill in the art will appreciate that diverse variations and modifications are possible, without controlling the technical spirit or essential features of the disclosure. Thus, the above embodiments should be understood not to be restrictive but to be illustrative, in all aspects. For example, respective elements described in an integrated form may be dividedly used, and the divided elements may be used in a state of being combined.

While one or more example embodiments have been described with reference to the figures, it will be understood by those of ordinary skill in the art that various changes in form and details may be made therein without departing from the spirit and scope as defined by the following claims.

The invention claimed is:

1. A method, performed by a memory device accessible by a plurality of master devices, of controlling access of a master device of the plurality of master devices, the method comprising:
receiving, from the master device, an access request with respect to at least two banks of a plurality of banks included in the memory device;
determining whether access to each of the at least two banks is granted;
generating validity information including a first indication of at least one bank, among the at least two banks, to which access is granted and a second indication of at least one other bank, among the at least two banks, to which access is refused; and
transmitting the validity information to the master device,
wherein a number of bits of the validity information is based on a number of the at least two banks to which access is requested from the master device.

2. The method of claim 1, wherein the determining comprises:
determining whether a bank conflict occurs between the access request of the master device and another access request of another master device of the plurality of master devices;
when it is determined that the bank conflict occurs, determining a priority of the access request and the other access request; and
determining, based on the priority, whether access to each of the at least two banks is granted.

3. The method of claim 2, wherein the priority is determined based on an urgency level determined by the master device.

4. The method of claim 1, wherein the access request is a 2-bit signal including a partial access signal for requesting the first indication and the second indication.

5. The method of claim 1, wherein the master device is able to access at least one of the at least two banks.

6. The method of claim 1, further comprising:
performing data processing requested by the master device, with respect to the at least one bank to which access of the master device has been granted as a result of the determining.

7. The method of claim 1, further comprising:
receiving, from the master device, an access request with respect to the at least one other bank to which access has been refused based on the first indication and the second indication.

8. A method, performed by a master device of a plurality of master devices, of accessing a memory device accessible by the plurality of master devices, the method comprising:
transmitting, to the memory device, an access request with respect to at least two banks of a plurality of banks included in the memory device; and
receiving, from the memory device, validity information including a first indication of at least one bank, among the at least two banks, to which access is granted and a second indication of at least one other bank, among the at least two banks, to which access is refused,
wherein a number of bits of the validity information is based on a number of the at least two banks to which access is requested from the master device.

9. The method of claim 8, wherein the access request is a 2-bit signal including a partial access signal for requesting the first indication and the second indication.

10. The method of claim 8, further comprising:
requesting data processed by the at least one bank to which access is granted, based on the first indication and the second indication.

11. The method of claim 8, further comprising:
re-transmitting an access request with respect to the at least one other bank to which access was refused, based on the first indication and the second indication.

12. A memory device accessible by a plurality of master devices, the memory device comprising:
an access request receiver configured to receive, from a master device of the plurality of master devices, an access request with respect to at least two banks of a plurality of banks included in the memory device;
an arbitrator configured to determine whether access of each of the at least two banks to which access was requested is granted, and to generate validity information including a first indication of at least one bank, among the at least two banks, to which access is granted and a second indication of at least one other bank, among the at least two banks, to which access is refused; and
a request result transmitter configured to transmit the validity information to the master device,
wherein a number of bits of the validity information is based on a number of the at least two banks to which access is requested from the master device.

13. The memory device of claim 12, wherein the arbitrator is further configured to:
determine whether a bank conflict occurs between the access request of the master device and another access request of another master device of the plurality of master devices,
determine a priority of the access request and the other access request when it is determined that the bank conflict occurs, and
determine, based on the priority, whether access to each of the at least two banks is granted.

14. The memory device of claim 13, wherein the priority is determined based on an urgency level determined by the master device.

15. A non-transitory computer-readable recording medium having recorded thereon a computer program, which, when executed by a computer, performs the method of claim 1.

* * * * *